United States Patent
Fyke

(10) Patent No.: US 8,175,662 B2
(45) Date of Patent: *May 8, 2012

(54) SYSTEM AND METHOD FOR SELECTIVELY ACTIVATING A COMMUNICATION DEVICE

(75) Inventor: Steven Fyke, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/900,908

(22) Filed: Oct. 8, 2010

(65) Prior Publication Data

US 2011/0021254 A1 Jan. 27, 2011

Related U.S. Application Data

(63) Continuation of application No. 10/995,221, filed on Nov. 24, 2004, now Pat. No. 7,826,874.

(51) Int. Cl.
*H04B 1/38* (2006.01)
*H04M 1/00* (2006.01)

(52) U.S. Cl. .......... 455/574; 455/127.5; 455/343.1; 455/343.2; 455/343.3

(58) Field of Classification Search .......... 455/574, 455/127.5, 343.1–343.5
See application file for complete search history.

(56) References Cited

U.S. PATENT DOCUMENTS

| | | | |
|---|---|---|---|
| 5,548,832 A | 8/1996 | Karam | |
| 5,729,604 A | 3/1998 | Van schyndel et al. | |
| 5,991,827 A | 11/1999 | Ellenby et al. | |
| 6,452,494 B1 | 9/2002 | Harrison | |
| 6,801,794 B2 * | 10/2004 | Bauer | 455/574 |
| 7,010,710 B2 | 3/2006 | Piazza | |
| 7,498,951 B2 | 3/2009 | Wardimon | |
| 2003/0085870 A1 | 5/2003 | Hinckley | |
| 2003/0197597 A1 | 10/2003 | Bahl et al. | |
| 2004/0029546 A1 | 2/2004 | Tsuchi et al. | |
| 2004/0127210 A1 | 7/2004 | Shostak | |
| 2005/0057548 A1 | 3/2005 | Kim | |
| 2005/0120255 A1 | 6/2005 | Padawer et al. | |
| 2005/0164633 A1 | 7/2005 | Linjama et al. | |
| 2005/0221791 A1 | 10/2005 | Angelhag | |
| 2005/0255894 A1 | 11/2005 | Heller | |
| 2006/0052109 A1 | 3/2006 | Ashman et al. | |
| 2006/0101581 A1 | 5/2006 | Blanchard et al. | |

FOREIGN PATENT DOCUMENTS

| | | |
|---|---|---|
| EP | 1 355 223 | 10/2003 |
| JP | 57043201 | 3/1982 |
| WO | WO 00/78012 | 12/2000 |
| WO | WO 03/079281 A1 | 9/2003 |

* cited by examiner

*Primary Examiner* — Tuan Pham
(74) *Attorney, Agent, or Firm* — McCarthy Tetrault LLP

(57) ABSTRACT

The disclosure provides a system and method for detecting activation of a communication device via passive means. For the system and method, the device comprises a casing for housing a display and a keyboard; a microprocessor controlling aspects of the keyboard and display; a passive usage sensor; and a power application operating on the microprocessor. The power application monitors the usage sensor for a signal indicating movement of the device from a resting location when the device is in a low power mode and upon detection of the signal for provides power to at least one additional element in the device.

14 Claims, 2 Drawing Sheets

SYSTEM AND METHOD FOR SELECTIVELY ACTIVATING A COMMUNICATION DEVICE

RELATED APPLICATION

This application is a continuation application of U.S. application Ser. No. 10/995,221 filed on Nov. 24, 2004 now U.S. Pat. No. 7,826,874.

FIELD OF DISCLOSURE

The present disclosure relates to a system and method for activating a communication device, more particularly activating the device after sensing intent to use the device.

BACKGROUND

Current wireless handheld mobile communication devices perform a variety of functions to enable mobile users to stay current with information and communications, such as e-mail, corporate data and organizer information while they are away from their desks. A wireless connection to a server allows a mobile communication device to receive updates to previously received information and communications. The handheld devices optimally are lightweight, compact and low power to facilitate usage by professionals on the go. In order to conserve battery power, the devices can be placed into reduced power or sleep modes, where portions of the device (such as the display and alarms) are either not used, powered off, or used in a restricted, power-saving mode. Such modes are generally programmable, wherein the user manually programs the device to have: (i) a start or sleep time; and (ii) an end or wake-up time. At the sleep time, the devices automatically enter a predetermined sleep mode and shut off predetermined portions of the devices. Generally in a sleep mode, sufficient power is still provided to the devices in order for it to maintain its data, essential programs and clock information and to operate programs and processes during the sleep mode. At the wake-up time, the devices are typically brought back to a full power mode, where all functionality of the devices is available to the user.

However, often prior art systems and methods for power control of such devices are inflexible in their program modes, typically mandating that if the device is required to be used during its sleep mode, the device must be manually activated in some manner (e.g. activating a power switch), and then manually de-activated in some manner (e.g. de-activating the power switch).

In some circumstances, a user of a device may need to only use the device for a brief period of time to check a status of something tracked by the device, e.g. the receipt of any incoming messages, calls or emails or even the current time. The prior art devices require the user to actively turn on the device by pressing an appropriate key, use it, then actively turn off the device. This process is cumbersome, especially if the user wishes only to check the status of an event.

There is a need for a system and method which addresses deficiencies in the prior art of selectively turning on (activating) and then turning off (deactivating) a communication device.

SUMMARY

In a first aspect, a power management system for an electronic device is provided. The system comprises: a microprocessor controlling the device; an accelerometer; and a power application operating on the microprocessor to place the device in one of a plurality of power consumption modes by monitoring signals from the accelerometer and changing modes within the plurality of power consumption modes based on the signals. The power application provides instructions to the microprocessor to place the device in a higher power state than a low power state when the device is in a stationary state at a resting location and the accelerometer provides a first signal indicating a subsequent movement of the device from the resting location to a first location in a spaced relationship from the resting location and then activate a backlight for the device when placed in the higher power state; and to place the device in the low power state from the higher power state upon receipt of a signal indicating return of the device from the first location to around the resting location, the signal being derived from data from the accelerometer, and then deactivate the backlight.

In the system, the power consumption modes may include the low power state, the higher power state, at least an off state, a fully on state; and the low power state may consume less power than the fully on state and more power than the off state.

In the system, the power application may turn off the backlight for the device when the device is the low power state.

In the system, the low power state may be a partially-off state.

In the system, the power application may activate another element in the device after receiving the first signal when the device is placed from the low power state to the higher power state.

In the system, the backlight may have a variable intensity set by the power application.

In the system, after placing the device in the higher power state, the power application may further track a time that the device is in the higher power state, may monitor for receipt of a non-use signal from the sensor indicating an intent to return to the lower power state and may monitor for receipt of a return signal from the sensor indicating return of the device at or near the resting location.

In the system, the signal indicating return of the device to around the resting location may be based on displacement signals provided by the accelerometer.

In a second aspect, a method of selectively placing an electronic device in one of a plurality of power consumption modes is provided. The method comprises: monitoring a sensor in the device for a first signal indicating movement of the device from a resting location when the device is operating in both a low power state and a stationary state; placing the device in a higher power state from the low power state when the device is stationary and the sensor provides a first signal indicating subsequent movement of the device and then activating a backlight for the device when the device is in the higher power state; and placing the device in the low power state from the higher power state upon receipt of a signal from the sensor indicating return of the device at or near the resting location and deactivating the backlight.

In the method, the power consumption modes may further include an off state, a fully on state; and the low power state may consume less power than the fully on state and more power than the off state.

The method may further comprise turning off the backlight system when the device is the low power state.

In the method, the sensor may be an accelerometer and the signal indicating return of the device to around the resting location may be based on displacement signals provided by the accelerometer.

In the method, the sensor may be selected from a motion detector, an accelerometer, a switch and a proximity sensor.

The method may further comprise: while the device is in the higher power state, tracking a time that the device is in the higher power state, monitoring for receipt of a non-use signal from the sensor indicating an intent to return to the lower power state and monitoring for receipt of a return signal from the sensor indicating return of the device at or near the resting location.

The method may further comprise upon activating the backlight system upon detection of the first signal, activating another element in the device.

In the method, the low power state may be a partially off state.

In another aspect, a handheld mobile communication device is provided. The device comprises a casing for housing a display and a keyboard; a microprocessor controlling aspects of the keyboard and display; a passive usage sensor; and a power application operating on the microprocessor. The power application monitors the usage sensor for a signal indicating movement of the device from a resting location when the device is in a low power mode and upon detection of the signal for providing power to at least one additional element in the device.

In the device, the passive usage sensor may be selected from a motion detector, an accelerometer, a switch and a proximity sensor.

In the device, the power application may automatically turn off the element after a preset amount of time of being activated has passed.

In the device, the element may be a backlighting system for the display.

In the device, the backlighting system may have a variable intensity set by said power application.

In the device the passive usage sensor may be the accelerometer. Further, the power application tracks: when the device is in the low power mode in the resting location; when the accelerometer provides signals indicating movement of the device from the resting location; and when the accelerometer provides signals indicating return of the device to the resting location.

In the device, the passive usage sensor may be the proximity sensor. Further, the power application tracks: when the device is in the low power mode in the resting location; when the proximity sensor provides signals indicating movement of the device from the resting location; and when the proximity sensor provides signals indicating return of the device to the resting location.

In another aspect, a method for selectively activating at least one element for a handheld mobile communication device is provided. The method comprises: monitoring for usage of the device when the device is in a resting location by monitoring for activation of a sensor which provides sensing information which infers of usage of the device; and upon inferring activation of the device from the sensor, providing power to at least one additional element in the device.

The method may select the sensor from a motion detector, an accelerometer, a switch and a proximity sensor.

In the method, the additional element may be turned off after a preset amount of time of being activated has passed.

In the method, the additional element may be a backlighting system for a display associated with the device.

In the method, the sensor may be an accelerometer. Further, the method comprises tracking: when the device is in the low power mode in the resting location; when the accelerometer provides signals indicating movement of the device from the resting location; and when the accelerometer provides signals indicating return of the device to the resting location.

In the method the sensor may be a proximity sensor. Further, the method comprises tracking: when the device is in the low power mode in the resting location; when the proximity sensor provides signals indicating movement of the device from the resting location; and when the proximity sensor provides signals indicating return of the device to the resting location.

In other aspects various combinations of sets and subsets of the above aspects are provided.

BRIEF DESCRIPTION OF THE DRAWINGS

The foregoing and other aspects of the disclosure will become more apparent from the following description of specific embodiments thereof and the accompanying drawings which illustrate, by way of example only, the principles of the disclosure. In the drawings, where like elements feature like reference numerals (and wherein individual elements bear unique alphabetical suffixes).

DETAILED DESCRIPTION

Figure 1:
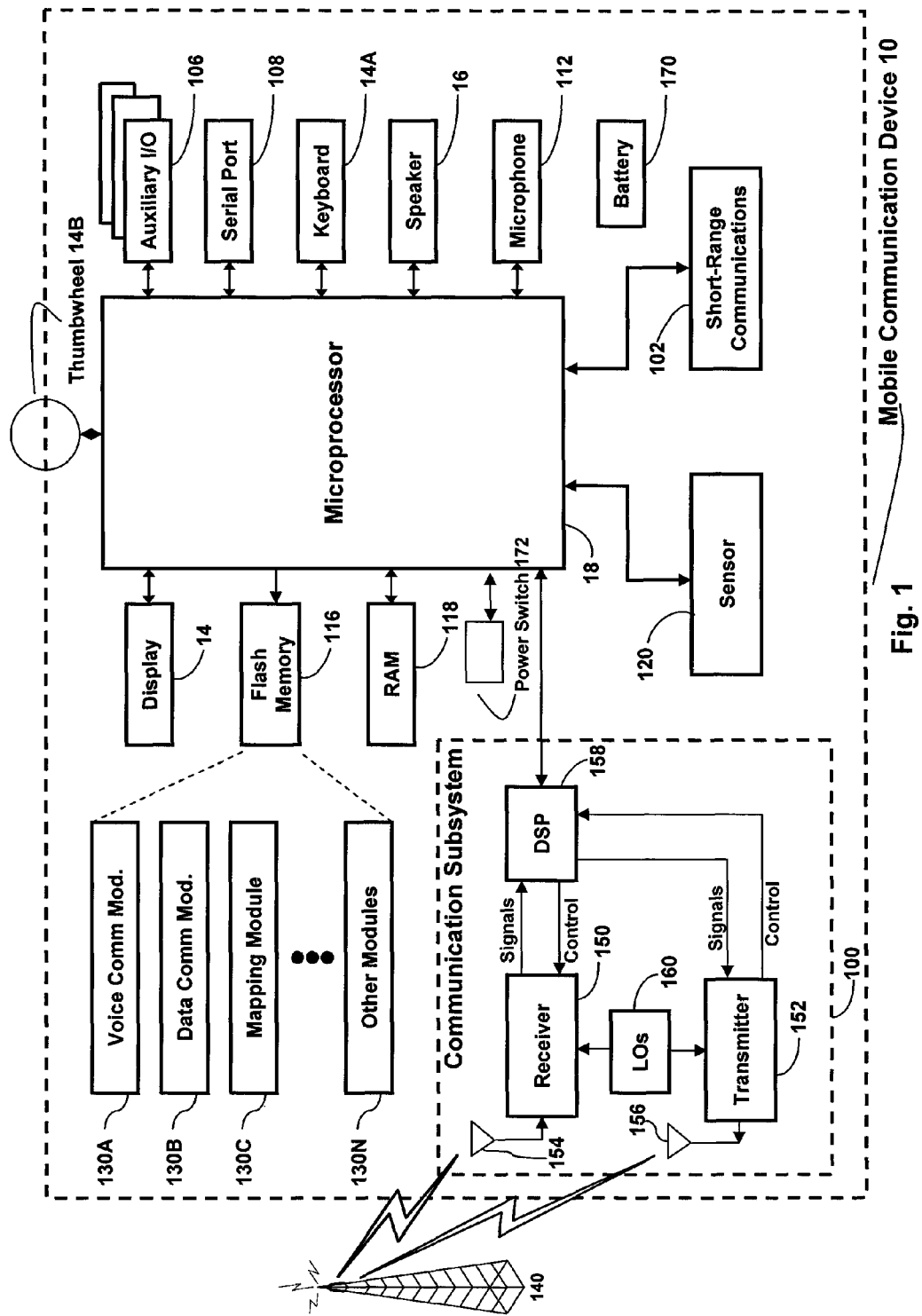
FIG. 1 illustrates a block diagram of an exemplary mobile device that incorporates an embodiment of the disclosure.

The description which follows, and the embodiments described therein, are provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

FIG. 1 illustrates a handheld mobile communication device 10 including a housing, an input device (e.g. keyboard 14A or thumbwheel 14B) and an output device (a display 16), which is preferably a graphic Liquid Crystal Display (LCD). Other types of output devices may alternatively be utilized. A processing device (a microprocessor 18) is shown schematically in FIG. 1 as coupled between keyboard 14A, thumbwheel 14B, display 16 and a series of other internal devices to device 10. The microprocessor 18 controls the operation of the display 16, as well as the overall operation of the device 10, in response to actuation of keys on the keyboard 14A or thumbwheel 14B by a user. Exemplary microprocessors for microprocessor 18 include Data 950 (trade-mark) series microprocessors and the 6200 series microprocessor, both available from Intel Corporation.

Physically for device 10, its housing may be elongated vertically, or may take on other sizes and shapes (including clamshell housing structures). The keyboard may include a mode selection key, or other hardware or software for switching between text entry and telephony entry.

Although not shown as a separate item, when display 16 is implemented as a LCD, a backlighting system is almost invariably used to assist in the viewing display 16, especially under low-light conditions. A typical backlighting system comprises a series of LEDs and a controller to control activation of the LEDs. Depending on a brightness level selected for display 16, all or some of the LEDs may be powered in a full duty cycle or a duty-cycle approaching 0%.

In addition to the microprocessor 18, other internal devices of the device 10 are shown schematically in FIG. 1. These devices include: a communication subsystem 100, a short-range communication subsystem 102, keyboard 14A, thumbwheel 14B and display 16. Other input/output devices include a set of auxiliary I/O devices 106, a serial port 108, a speaker 110 and a microphone 112. Memory for device 10 is provided in flash memory 116 and Random Access Memory (RAM) 118. Finally, additional sensor 120 and various other device subsystems (not shown) are provided. The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as another software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. PIM application is also preferably capable of sending and receiving data items via a wireless network 140. Preferably, data items managed by PIM application are seamlessly integrated, synchronized and updated via wireless network 140 with device user's corresponding data items stored or associated with a host computer system.

Communication functions, including data and voice communications, are performed through the communication subsystem 100, and possibly through the short-range communication subsystem 102. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice networks, both separate and integrated, may also be utilized with device 10.

Network access requirements vary depending upon the type of communication system. For example, in the Mobitex (trade-mark) and DataTAC (trade-mark) networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, device 10 may send and receive communication signals over communication network 140. Signals received from communication network 140 by the receive antenna 154 are routed to receiver 150, which provides for signal amplification, frequency down conversion, filtering, channel selection, etc., and may also provide analog to digital conversion. Analog-to-digital conversion of received signals allows the DSP 158 to perform more complex communication functions, such as signal demodulation and decoding. In a similar manner, signals to be transmitted to network 140 are processed (e.g., modulated and encoded) by DSP 158 and are then provided to transmitter 152 for digital to analog conversion, frequency up conversion, filtering, amplification and transmission to communication network 140 (or networks) via the transmit antenna 156.

In addition to processing communication signals, DSP 158 provides for control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is input to microprocessor 18. The received signal is then further processed by microprocessor 18 for an output to the display 16, or alternatively to some other auxiliary I/O devices 106. A device user may also compose data items, such as e-mail messages, using keyboard 14A, thumb-wheel 14B and/or some other auxiliary I/O device 106, such as a touchpad, a rocker switch or some other type of input device. The composed data items may then be transmitted over communication network 140 via communication subsystem 100.

In a voice communication mode, overall operation of device 10 is substantially similar to the data communication mode, except that received signals are output to speaker 110, and signals for transmission are generated by microphone 112. Alternative voice or audio I/O subsystems, such as a voice message recording subsystem, may also be implemented on device 10. In addition, display 16 may also be utilized in voice communication mode, for example, to display the identity of a calling party, the duration of a voice call, or other voice call related information.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack.

Power switch 172 provides an "on/off" switch for device 10. Upon activation of power switch 172 a process operating on device 10 is initiated to turn on device 10 and preferably initiate all functionality of device 10. Upon deactivation of power switch 172, another process is initiated to turn off device 10. Power to device 10 may also be controlled by other devices and by internal software applications, as described further below.

Device 10 can be placed in one of several power consumption modes including: a fully on mode, a partially on mode and a fully off mode. In the fully off (deep sleep) mode, power is provided to only a minimal set of component to enable device 10 to operate. These components typically include those which at a minimum, provide power to microprocessor 18 and its related memory, clocks and other devices to allow device 10 to maintain its internal clock, software applications and data, and recognize a stimulus (e.g. activation of the power on button) to revive device 10 from its fully off/deep sleep mode. In the partially on mode one or more functionalities of device 10 are either disabled or reduced. For example, one or both of communication system 100 and communication subsystem 102 may be disabled. Also, the backlighting system for display 16 may be reduced in intensity; to conserve power, the backlight system is either set to activate the LEDs at a low duty cycle frequency or not activate the LEDs at all. Other internal devices of device 10 can also be programmed to operate in different power modes. It will be appreciated that there may be several partially on modes where different sets of functionalities may be enabled/disabled in each mode.

In particular, device 10 can be placed into a sleep mode, wherein a schedule can be provided to device 10 to define "on" and "off" cycles for device 10 depending on the time of day and the date. Therein, the user accesses a programming menu in device 10 and accesses a scheduler, then enters data for an activation cycle using keyboard 14A. Alternatively, such data can be downloaded to device 10 from a remote source. Typically, programming for the sleep mode is achieved through a programming menu, power application generated on display 16. The menu provides text inviting the user to enter "on" and "off" times in appropriate weekday fields as activation boundaries for weekdays. Text on the screen may also invite the user to select what level of power is to be provided to device 10 during a sleep mode. Once the data is entered by the user and submitted to device 10 from the menu, application processes the time data and updates or generates an activation cycle for device 10. Thereafter, power application monitors its internal clock to determine the current time and date and automatically turns on and off identified elements in device 10 according to the time data stored for the activation cycle. The deployment and implementation of the scheduler may be implemented in any programming language.

Also, device 10 can have a built in program routine to automatically move from one power state to a lower power state when a predetermined event occurs. Such an event can be considered to be an "auto-off" event for device 10. For example, subsystem 102 is enabled and no message is received after a certain set time limit, power application can be set to cause device 10 to move to a lower power mode and disable power to subsystem 102. Signals and absence of signals from other elements in device 10 can be used by the routine to change the power state of device 10. To allow entry of such "auto-off" events, device 10 provides a similar user interface of menu screen(s) on display 16.

The embodiment provides a system and method activating device 10 from a lower power mode (e.g. a sleep mode) to a higher power mode (e.g. a fully on mode) by inferring intended use of device 10, preferably without monitoring for activation of power switch 172 or any specific activation of any other key or input device which the user typically specifically activates on device 10.

To that end, device 10 has also has one or more sensors 120 to detect its state of activation. Such sensors are passive, in a sense that the user does not have to manually activate the sensor to cause device 10 to activate. Such sensors are selected to detect secondary conditions which are used to infer that device 10 is being used. For example, one type of sensor 120 is an activation sensor providing an indication of movement or usage of device 10. As such, when the activation sensor is tripped, the program operating in device 10 makes a determination that device 10 is about to be used and activates one or more of its functional components which are currently not active. It is notable that the activation of the components is done without the user having to specifically press the power switch 172, depress any key in keypad 14A or spin thumbwheel 14b.

The activation sensor may be a mercury switch, an accelerometer or any other motion sensing device which can be incorporated within device 10. If sensor 120 is implemented as a mercury switch (or a comparable tilt switch), then electrical signals generated from the switch are provided to microprocessor 18 and software operating on microprocessor 18 is provided to detect signals from the switch and to determine whether the signals received mean that device 10 is at rest or is moving.

If sensor 120 is implemented as an accelerometer, signals therefrom can be used by the power application to detect motion and to detect a displacement vector of device 10, since accelerometers, as force measuring devices, provide force information which can be used to derive displacement information using mathematical integration methods. As such, signals from the accelerometer can be used to detect when device 10 is moved from its resting location to an active position and when device 10 is returned to its resting location. Such numerical data integration techniques can be implemented in the power application as an appropriate function, using programming techniques known in the art.

Alternatively still, sensor 120 may be a spring loaded switch which is biased to be in one position (either open or closed) when device 10 is placed flatly on a surface (e.g. flat on its back, if sensor 120 is a spring-loaded switch located on the back of device 10) and is biased to be in a second position (either closed or open) when device 10 is lifted from the surface. In still another sensing arrangement, if device 10 is electrically connected to a docking station, allowing device 10 to communicate with another device such as a computer (not shown), then the application can detect when device 10 is docked and undocked in its cradle. Other embodiments may use wireless systems, such as Bluetooth-enabled (trademark) systems, to detect when device 10 is near a detecting or docking station. Other types of sensors known in the art may be used for sensor 120. For each type of sensor 120, depending on its sensing dynamics, one detection of one state will indicate that device 10 is being moved and detection of another state will indicate that device 10 has stopped being moved. It will be appreciated that for each of the different types of sensors for motion sensor 120, an appropriate software interface is provided to enable to the power application to register the status of sensor 120.

Alternatively, sensor 120 is a light sensor which is used by power application to detect when it is in a lit, dimly lit or unlit environment or when it is nighttime or daylight environment. The power application may also use data from sensor 120 with its data on the current time, date and location of device 10 to determine ambient daylight conditions for device 10.

In other embodiments, multiple sensors 120 may be provided and the power application may provide different emphasis on signals provided from different sensors 120.

In order to utilize signals from sensor(s) 120, power application is embodied in a software application (for example, as one of the software applications described above) enabling it to selectively control power of one or more internal elements of device 10, including, for example, display 16, keyboard 14A, thumbwheel 14B, microphone 112, short range communication module 102 and communication subsystem 100. The power application operates on microprocessor 18, has access to the system clock of device 10 and can selectively provide power control signals to one or more of the internal elements. Such power control signals include signals: to turn off the element completely; activate the element in a full power, full capability mode; and activate the element in a mode which provides capabilities somewhere between full power and no power.

The power application operates in several modes. A first mode is when device 10 is in a full power mode; therein the power application takes no substantive activity and waits for device 10 to be de-activated into a lower powered state, either through an automatic shut-off routine (e.g. after a predetermine time of non-use or when a predetermined time for shut-off passes) or active shut-off of device 10 by the user. Upon detection of de-activation of device 10, a second mode monitors for continually usage of device 10 for one of the following conditions: active reactivation of device 10 (e.g. through activation of power switch 172, pressing of a key on keypad 14A or scrolling of thumbwheel 14B); or a signal from sensor(s) 120. If the second condition is detected, then device 10 is brought to a higher power state for a preset amount of time.

The second step is to monitor for activation of device 10 when it is in a sleep mode or any power mode which is not the full power mode. One monitoring process waits for an active activation of device 10 to occur, e.g. monitoring for activation of power key 172, a key on keyboard 14A or thumbwheel 14B.

For the second step, one technique for detecting when device 10 is being used is to infer usage when device 10 is being moved using signals from sensor(s) 120. If the user subsequently picks up device 10, sensor(s) 120 detect movement from a resting location. As such, for example, in use, a user can simply pick up device 10 when it is in its dormant state and as sensor 120 recognizes movement of device 10, device 10 can be brought to a higher power state.

Upon detection of activation, device 10 can power up backlighting for display 16, can power up one or more subsystems 102 or can power up one or more other internal elements of device 10.

Upon detection of use of device 10, power application begins a timer which is used to track time after activation and monitors for activity of device 10. After a predetermined length of time of non usage (e.g. 5, 10, 15, 20, 30, 45, 60 minutes or more), power application can selectively mark device 10 as not being used and can place device 10 in a lower power consumption mode. The absence of use may be determined by monitoring the presence or absence of an event. For example the events may include: activation or non-activation of a key on keyboard 14A or scrolling, depressing or non-activation of thumbwheel 14B, movement or non-movement of device 10, active turn off of device 10, docking or undocking of device 10 from a docking device and return of device 10 to its resting location. The detection of use and then the detection of absence of use would complete one activation cycle for device 10. Power application tracks the time and duration of this activation cycle.

It will be appreciated that with the application, a user can simply pick up device 10, have it power on one or more previously dormant functions, e.g. backlighting for display 16, have the function operational for a preset limited period of time, (e.g. a number of seconds or a number of minutes), then have the function return to its dormant state preferably without having to specifically activate then deactivate power switch 172.

After a certain predetermined period of non use, or if sensor 120 is an accelerometer, after detection that device 10 has been returned to its initial location when it in its dormant state, application can then place device 10 into a dormant state.

Figure 2:
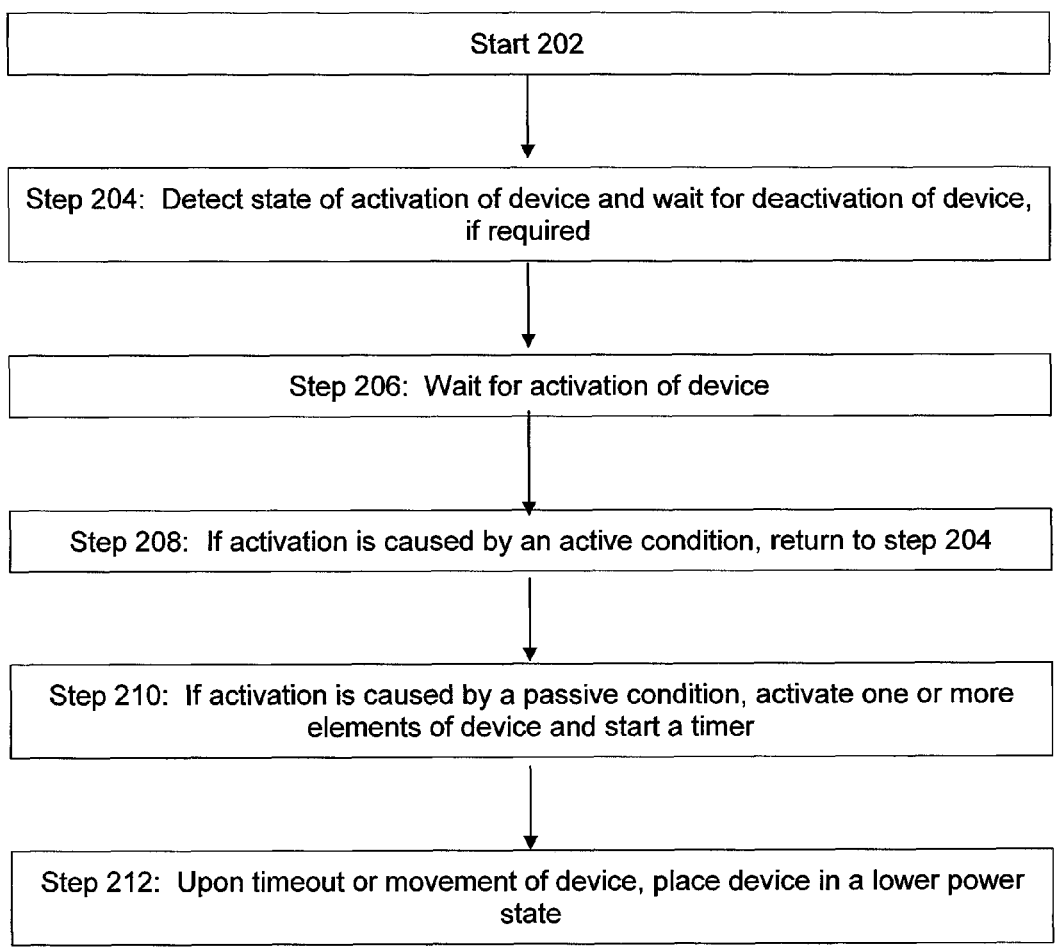
FIG. 2 illustrates a flow diagram of selectively activating and then selectively deactivating the device associated with the embodiment of FIG. 1.

Referring now to FIG. 2, further detail is provided on the operation of the second mode of power application, where algorithm 200 is shown. After start process 202, if device 10 is in a full power mode, then power application waits for it to move to a partially on or fully off power mode. See step 204. Then, once it has left the full power mode, in step 206, power application waits for activation of device 10. In step 208, if activation of device 10 is caused by an active condition, power application returns to step 204. In step 210, if activation is caused by a passive condition detected on device 10, then device 10 is placed in an conditionally-activated state. In the conditionally-activated state one or more elements of device 10 is activated and a timer is started. In step 212, upon a timeout of the timer or a off condition of device 10, power application places device 10 to a lower power state. As noted earlier, preferably, the conditionally-activated state is a time limited state. As such, in step 212, the power application tracks a timer to see how long it has been in the conditionally-activated state. Once the time limit expires, then the elements activated are turned off completely or put into a lower power mode. Alternatively, the activated state may be ended by the detection of a further signal from sensor(s) 120 or another element, such as from keypad 14A, power switch 172, thumbwheel 14B or detection of an "auto-off" event. Alternatively still, a signal from sensor(s) 120 can by used to infer that more time is needed for the conditionally-activated state and detection of such signal can be used to reset the timer.

The timer is implemented in software using the internal clock available from microprocessor 18 and data for the timer is stored in memory 116. It will be appreciated that algorithm 200 may be implemented as a series of interrupt routines, thereby allowing other applications to operate concurrently with it in a real time manner. Other implementations providing real time detection and monitoring of usage may be used.

In other embodiments, when power application is in the conditionally-activated state, if another movement is detected by sensor 120 or if power switch 172 is activated, device 10 may be placed into a full power mode, and power application can then terminate.

Although the disclosure has been described with reference to certain specific embodiments, various modifications thereof will be apparent to those skilled in the art without departing from the scope of the disclosure as outlined in the claims appended hereto.

The invention claimed is:

1. A power management system for an electronic device, comprising:
   a microprocessor controlling said electronic device;
   an accelerometer; and
   a power application operating on said microprocessor to place said electronic device in one of a plurality of power consumption modes by monitoring signals from said accelerometer and changing modes within said plurality of power consumption modes based on said signals, said power application providing instructions to said microprocessor to place said electronic device in a higher power state than a low power state when said electronic device is in a stationary state at a resting location and said accelerometer provides a first signal indicating a subsequent movement of said electronic device from said resting location to a first location in a spaced relationship from said resting location and then activate a backlight for said electronic device when placed in said higher power state; and place said electronic device in said low power state from said higher power state upon receipt of a signal indicating return of said electronic device from said first location to around said resting location, said signal being derived from data from said accelerometer, and then deactivate said backlight, wherein said low power state is a partially-off state; and said backlight has a variable intensity set by said power application.

2. The power management system of claim 1, wherein:

said plurality of power consumption modes include said low power state, said higher power state, at least an off state, a fully on state; and said low power state consumes less power than said fully on state and more power than said off state.

3. The power management system of claim 1, wherein said power application turns off said backlight for said electronic device when said electronic device is in said low power state.

4. The power management system of claim 1, wherein said power application activates another element in said electronic device after receiving said first signal when said electronic device is placed from said low power state to said higher power state.

5. The power management system as claimed in claim 1, wherein:

after placing said electronic device in said higher power state, said power application further tracks a time that said electronic device is in said higher power state, monitors for receipt of a non-use signal from said accelerometer indicating an intent to return to said lower power state and monitors for receipt of a return signal from said accelerometer indicating return of said electronic device at or near said resting location.

6. The power management system of claim 1, wherein said signal indicating return of said electronic device to around said resting location is based on displacement signals provided by said accelerometer.

7. A method of selectively placing an electronic device in one of a plurality of power consumption modes, comprising:

monitoring a sensor in said electronic device for a first signal indicating movement of said electronic device from a resting location when said electronic device is operating in both a low power state and a stationary state;

placing said electronic device in a higher power state from said low power state when said electronic device is stationary and said sensor provides a first signal indicating subsequent movement of said electronic device and then activating a backlight for said electronic device when said electronic device is in said higher power state; and placing said electronic device in said low power state from said higher power state upon receipt of a signal from said sensor indicating return of said electronic device at or near said resting location and deactivating said backlight, wherein said low power state is a partially-off state;

said backlight has a variable intensity set by a power application;

said sensor is selected from a motion detector, an accelerometer, a switch and a proximity sensor; and said signal indicates return of said electronic device to around said resting location is based on displacement signals provided by said accelerometer.

8. The method of selectively activating a backlight as claimed in claim 7, wherein:

said plurality of power consumption modes further include an off state, a fully on state; and said low power state consumes less power than said fully on state and more power than said off state.

9. The method of selectively activating a backlight as claimed in claim 8, further comprising:

turning off said backlight system when said electronic device is in said low power state.

10. The method of selectively activating a backlight as claimed in claim 7, wherein said sensor is said accelerometer.

11. The method of selectively activating a backlight as claimed in claim 7, further comprising:

while said electronic device is in said higher power state, tracking a time that said electronic device is in said higher power state, monitoring for receipt of a non-use signal from said sensor indicating an intent to return to said lower power state and monitoring for receipt of a return signal from said sensor indicating return of said electronic device at or near said resting location.

12. The method of selectively activating a backlight as claimed in claim 7, further comprising:

upon activating said backlight system upon detection of said first signal, activating another element in said electronic device.

13. The method of selectively activating a backlight as claimed in claim 11, further comprising:

placing said electronic device in said low power state from said higher power state and deactivating said backlight if a predetermined length of time of non usage of said electronic device is indicated by said time prior to receipt of said signal indicating return of said electronic device at or near said resting location.

14. The power management system of claim 5, wherein said power application further provides instructions to said microprocessor to place said electronic device in said low power state from said higher power state and deactivate said backlight if a predetermined length of time of non usage of said electronic device is indicated by said time prior to receipt of said signal indicating return of said electronic device at or near said resting location.

* * * * *

UNITED STATES PATENT AND TRADEMARK OFFICE
CERTIFICATE OF CORRECTION

| | | |
|---|---|---|
| PATENT NO. | : 8,175,662 B2 | Page 1 of 1 |
| APPLICATION NO. | : 12/900908 | |
| DATED | : May 8, 2012 | |
| INVENTOR(S) | : Steven Fyke | |

It is certified that error appears in the above-identified patent and that said Letters Patent is hereby corrected as shown below:

On the Title page: Item (73) Assignee:

In Assignee name: replace the word "in" with --In-- (capital i)

Signed and Sealed this
Thirtieth Day of April, 2013

Teresa Stanek Rea
*Acting Director of the United States Patent and Trademark Office*